United States Patent
Kun-Hao

(10) Patent No.: US 11,920,624 B2
(45) Date of Patent: Mar. 5, 2024

(54) Zn-Ni AS A COATING LAYER ON SELF-DRILLING SCREWS OF AUSTENITIC STAINLESS STEEL

(71) Applicant: SFS intec Holding AG, Heerbrugg (CH)

(72) Inventor: Huang Kun-Hao, Thal (CH)

(73) Assignee: SFS Group International AG, Heerbrugg (CH)

( * ) Notice: Subject to any disclaimer, the term of this patent is extended or adjusted under 35 U.S.C. 154(b) by 291 days.

(21) Appl. No.: 17/386,950

(22) Filed: Jul. 28, 2021

(65) Prior Publication Data

US 2022/0034352 A1 Feb. 3, 2022

(30) Foreign Application Priority Data

Jul. 29, 2020 (EP) .................................. 20188321

(51) Int. Cl.
*F16B 25/10* (2006.01)
*C22C 18/00* (2006.01)
*C23C 30/00* (2006.01)
*F16B 25/00* (2006.01)

(52) U.S. Cl.
CPC ............ *F16B 25/103* (2013.01); *C22C 18/00* (2013.01); *C23C 30/005* (2013.01); *F16B 25/00* (2013.01); *F16B 25/10* (2013.01)

(58) Field of Classification Search
CPC .... F16B 25/00; F16B 25/0084; F16B 25/103; F16B 25/10; C22C 18/00; C23C 30/005
USPC ............................ 411/386, 387.1, 387.7, 914
See application file for complete search history.

(56) References Cited

U.S. PATENT DOCUMENTS

| | | | | |
|---|---|---|---|---|
| 4,091,173 A | * | 5/1978 | Hage | F16B 33/06 428/656 |
| 4,730,970 A | * | 3/1988 | Hyner | C21D 9/0093 411/902 |
| 4,837,090 A | * | 6/1989 | Hyner | C25D 5/10 428/626 |
| 5,193,958 A | * | 3/1993 | Day | B05D 5/08 411/914 |
| 5,260,100 A | | 11/1993 | Day | |
| 5,275,892 A | * | 1/1994 | Hyner | C25D 5/10 411/902 |
| 5,304,023 A | * | 4/1994 | Toback | F16B 33/004 411/387.3 |

(Continued)

FOREIGN PATENT DOCUMENTS

| EP | 2080572 | 7/2009 |
|---|---|---|
| EP | 2468929 | 6/2012 |

*Primary Examiner* — Roberta S Delisle
(74) *Attorney, Agent, or Firm* — Volpe Koenig

(57) ABSTRACT

A self-drilling screw (10) having a head (20), a shaft (30) at least partially wearing a thread (35) and a drill point (40). The base material of the screw (10) including the drill point (40) is integrally manufactured from an austenitic 300 series steel with a surface hardness (uncoated) of 400-600 HV 0.3. The surface of the screw has a top coating of Zn—Ni with a Ni-content between 12-15% deposited on the austenitic base material. This self-drilling screw (10) is manufactured from a blank of raw austenite 300 series steel which is initially squeezed by cold forming to reduce its diameter in a first operation and, in following cold forming operations the head, the drill point and a thread are formed.

10 Claims, 1 Drawing Sheet

(56) References Cited

U.S. PATENT DOCUMENTS

| | | | | |
|---|---|---|---|---|
| 5,417,776 | A * | 5/1995 | Yoshino | C23C 28/00 411/902 |
| 6,874,986 | B2 * | 4/2005 | Koppel | F16B 33/008 411/386 |
| 7,195,437 | B2 * | 3/2007 | Sakamoto | F16B 33/06 411/428 |
| 7,824,142 | B2 * | 11/2010 | Felder | C23C 28/023 411/487 |
| 7,950,885 | B2 * | 5/2011 | Rosenkranz | F16B 25/0026 411/258 |
| 2009/0047092 | A1 * | 2/2009 | Peffer | F16B 15/0092 411/257 |
| 2011/0255936 | A1 * | 10/2011 | Stager | F16B 25/0021 411/387.1 |
| 2013/0195580 | A1 * | 8/2013 | Kast | F16B 33/008 428/650 |
| 2015/0139751 | A1 * | 5/2015 | Zach | F16B 33/06 411/387.1 |
| 2017/0241466 | A1 | 8/2017 | Zach et al. | |
| 2019/0010767 | A1 | 1/2019 | Goto | |

\* cited by examiner

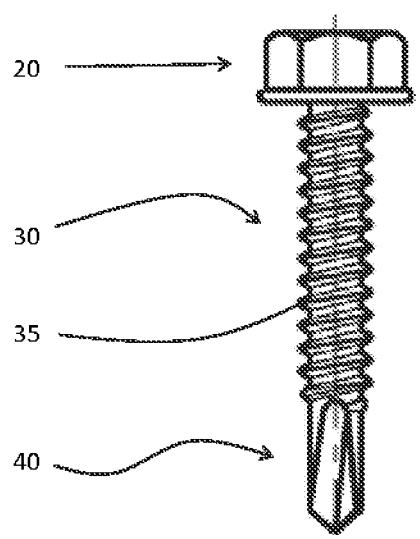

Zn-Ni AS A COATING LAYER ON SELF-DRILLING SCREWS OF AUSTENITIC STAINLESS STEEL

INCORPORATION BY REFERENCE

The following documents are incorporated herein by reference as if fully set forth: European Patent Application No. 20188321.2, filed Jul. 29, 2020.

TECHNICAL FIELD

This invention refers to a coating layer comprising a Zn—Ni layer deposited on top of a self-drilling screw made thoroughly from austenitic stainless steel.

TECHNICAL BACKGROUND

Austenitic stainless steel is a specific type of stainless steel alloy. Austenitic stainless steels include austenite as their primary crystalline structure (face-centered cubic). This austenite crystalline structure is achieved by sufficient additions of austenite stabilizing elements such as nickel, manganese and nitrogen. Their crystalline structure however prevent austenitic steels from being hardenable by heat treatment and makes them essentially non-magnetic.

There are two subgroups of austenitic stainless steel. 300 series stainless steels achieve their austenitic structure primarily by a nickel addition while 200 series stainless steels substitute manganese and nitrogen for nickel, though there is still a small nickel content.

300 series stainless steels (AISI reference) are the larger subgroup, with type 304 (also known as 18/8, 18/10 stainless steel) being the best-known one. Commonly known and used types are material numbers (EN number) 1.43XX, 1.44XX, e.g. 1.4301. 1.4310, 1.4315 and 1.4370.

Such stainless steels are commonly used for manufacturing stainless fasteners. In many applications, especially where fasteners are to be exposed to the environment and/or harsh conditions (sea air, corrosive conditions), the corrosion resistance of such austenitic stainless steels is being utilized. Since, as mentioned above, stainless steels cannot be hardened by heat treatment, the fields of application are limited. Fasteners with drill points, requiring high mechanical durability, usually cannot be formed from one single piece of such base material. Instead, drill points of carbon steel are being welded to a shaft made from stainless steel (therefore called bimetal or bimet fasteners). Although such processes are well established today, they are complex and expensive.

It is further quite common to apply metallic platings to such kind of fasteners. Zinc and Zinc-nickel coatings are commonly applied to protect the carbon steel drill point against corrosion. The applying of the coatings can be accomplished by well-known galvanic processes. Zn—Ni layers, depending on the acidity of the galvanic medium, will exhibit a more appealing appearance, because the structure of the layer is more dense and smoother.

In this context it is known, that pure Zn-layer (coatings) are more ductile (40-150 HV0.1) than Zn—Ni layer (410-450 HV0.1). An increasing share of Ni in the Zn—Ni coating will result in a layer more prone to crack formation, which is an unwanted behavior for fasteners. However, if a crack occurs, then due to a chemical process called cathodic protection effect, the less noble zinc will be dissolved first resulting in a concentration of Ni close to the surface of the base material. A thin, protective Ni-rich film will be the result.

PRIOR ART

Document EP 2 080 572 A1 describes a method for cold forging a high strength fastener from austenite 300 series material. A shaft of raw austenite 300 series steel is being initially squeezed by cold forming to reduce its diameter and to thus manufacture an intermediate shank. Then a head is being formed at one end of said shank. Later on a drill point is being formed by pinching, at the other end of said shank opposite to said screw head. At last, a thread is being formed on the shaft, thus realizing an integral fastener from austenitic stainless steel with a drill point. According to this document, the method results in an increased surface hardness of those regions which had been the drill point between 395 to 432 HV0.3.

While the hardness values described for that kind of manufacturing process are an improvement over Prior Art, they do still not achieve the level defined by standard bimet-screws with a C-steel drill point.

In an attempt to further enhance the hardness of full stainless screws one can apply a top coating with a specific hardness higher than the base material. For example a full stainless screw with 300 base material hardness can be top-coated with a chromium coating with >1000 HV. However, if the base material cannot properly dissipate stress applied to the surface (e.g. during setting such a screw) and e.g. yields, then the less ductile top-coating may chip, flake and peel.

SUMMARY

It is the objective of the present invention to further enhance the drilling performance of a high strength fastener made from a 300 series austenite material as described in Prior Art by means of a top-coating while avoiding the disadvantages of a traditional hard coating.

BRIEF DESCRIPTION OF THE FIGURES

FIG. 1 shows a principle sketch of a self-drilling screw 10 comprising a head 20, a shaft 30 at least partially wearing a thread 35 and a drill point 40.

DESCRIPTION OF THE INVENTION

According to the invention, a self-drilling screw 10 comprises a head 20, a shaft 30 at least partially wearing a thread 35 and a drill point 40. "At least partially wearing a thread" means that the shaft 30 exhibits a thread 35 which covers the shaft 30 of the screw 10 with exception of thread-free sections, e.g. directly adjacent the head 20. The base material of the screw 10 including the drill point 40 is being integrally manufactured from an austenitic 300 series steel with a surface hardness (uncoated) of 400-600 HV0.3. A coating layer of Zn—Ni with a Ni-content between 12-15% is being deposited on the austenitic base material.

This type of screw is being manufactured from a blank of raw austenite 300 series steel, which is being initially squeezed by cold forming to reduce its diameter in a first operation and, in following cold forming operations the head, the drill point and a thread are being formed. This two-step cold-forming process results in an improved surface hardness compared to a single step cold-forming. It has been found that the thickness of the Zn—Ni coating to be applied on the surface of the screw is preferably chosen to be between 5-30 µm. The Vickers hardness the Zn—Ni coating has been measured to be between 410-450 HV0.1. The coating can be applied by well-known galvanic processes for Zn—Ni.

In other words, the Zn—Ni coating in itself has a surface hardness lower than the base material it has been applied to. As mentioned above, a stainless steel screw is less sensitive to environmental impact like corrosion than a classic bimet screw due to its fully stainless steel body/base material. If one would nevertheless wish to enhance that property, a simple Zn top coating would do. Zn as a coating is more ductile than Zn—Ni, both are still less ductile than the a.m. base material after two cold-forming operations. One would therefore not expect that a softer layer on a harder base will increase the performance specifically of a self-drilling screw. Rather opposite, a Zn layer could be expected to have better smearing properties than a Zn—Ni layer.

The application area of screws described herein is e.g. the simplified assembly of thin metal sheets (a few mm, steel, aluminium). A user on a construction site or an assembly line will not be required to provide a second powered tool for pre-drilling holes. He/she will simply use the setting tool (e.g. a battery powered cordless screwdriver) for completing the process step.

A drill point has to sustain heavy (thermal) load during the setting process of a self-drilling screw. The performance of such a screw can be measured and specified e.g. by the percentage of failure. A failure could in this case mean: the drill point breaks or the cutting edges of the drill point wear out and the tip overheats. Another performance measurement could be the average time to drill through x mm of metal sheets or a specified drilling capacity of y mm/min. While the latter 2 measures depend also on user's capability and tool's performance the first measure "percentage of failure" indicates how much costly reworking can be avoided.

Experiments have shown that failures mostly occur during the very last moments of application. A cold-formed drill point does not have the lasting performance of a dedicated drill since it needs to perform only once. A less ideal design (also due to the mass manufacturing process) is therefore not a primary problem, however the cold-formed drill point will heat up considerably more due to considerable friction during the drilling process. Any top-coating to lower the friction of the drill-tip during use is thus an advantage.

To strike the balance between a reasonably priced product and safely avoiding performance issues (i.e. failures) is therefore not an easy task. Applying a Zn—Ni layer instead of a simple lubrification layer (wax) is not straightforward, because of the cost involved (also compared to a Zn layer) and the fact, that corrosion protection is not a main concern for a full-stainless steel screw. Further, a Zn—Ni coating has a hardness which is lower than the base material and thus there are little expectations that such a layer may help to improve the performance.

The inventors however found, that a Zn—Ni coating provides a two surprisingly synergetic advantages: Due to the fact that Zn—Ni hardness is comparable to the fully austenitic base material, the top coating is less prone to chip, flake and peel. Further, the Zn—Ni layers are smoother and exhibit less micro roughness than e.g. a Zn-layer. This again will improve the stripping of the chip(s) from the cutting edges and areas of the drill point during use. Since the chips play a major role in the heat dissipation of a self-drilling screw, a Zn—Ni layer supporting the removal of chips from the drill point seems to provide crucial seconds of additional lifetime.

A self-drilling screw according to the invention may additionally and advantageously exhibit a further lubrication coating comprising a wax, a finely dispersed thermoplast or both. This will additionally lower the friction, especially during the initial drilling sequence and thus postpones the heat-up of the screw's tip. It is sufficient to apply such a lubrication coating to the drill point and/or the threaded portions of the shaft. This application can be accomplished by dipping, spraying or other known processes.

Various experiments have been conducted to verify the superior properties of the proposed coating according to the invention. A 2 mm thick steel sheet of S235 structural steel has been used as testing material for several types of self-drilling screws. Tests with uncoated screws made from austenitic stainless steel according to Prior Art as described above failed. The drill edges of the tip were worn out before the steel sheet had been perforated. The same drill with a Zn—Ni coating as described plus a wax however performed well and could be used without issues. The performance was comparable to classic bimet screws with a Zn coating and a wax layer.

From another view point, the invention can be described as the use of a Zn—Ni coating on the surface of a self-drilling screw for enhancing its drilling performance, said screw comprising a head, a shaft at least partially wearing a thread and a drill point, the base material of the screw including the drill point having been integrally manufactured from an austenitic 300 series steel with an surface hardness (uncoated) of 400-600 HV0.3. Preferably, the Zn—Ni coating has a thickness between 5-30 µm and exhibits a Vickers hardness between 410-450 HV0.1

The invention claimed is:
1. A self-drilling screw (10) comprising:
a head (20),
a shaft (30) at least partially wearing a thread (35), and
a drill point (40),
wherein a base material of the screw (10) including the drill point (40) is integrally manufactured from an austenitic 300 series steel with an uncoated surface hardness of 400-600 HV 0.3, and
a coating of Zn—Ni with a Ni-content between 12-15% deposited on the austenitic 300 series steel base material.

2. The self-drilling screw according to claim 1, wherein the screw (10) is manufactured from a blank of raw austenite 300 series steel which is initially cold formed to reduce a diameter thereof in a first operation and, in following operations the head, the drill point and the thread are cold formed.

3. The self-drilling screw according to claim 1, wherein a thickness of the Zn—Ni coating is between 5-30 µm.

4. The self-drilling screw according to claim 1, wherein the Zn—Ni coating exhibits a Vickers hardness between 410-450 HV0.1.

5. The self-drilling screw according to claim 1, further comprising a further lubrication coating comprising a wax, a finely dispersed thermoplast or both, on the coating of Zn—Ni.

6. The self-drilling screw according to claim 5, wherein the further lubrication coating is applied substantially to the drill point and the shaft of the screw.

7. A method of enhancing drilling performance of a self-drilling screw (10), the method comprising:

manufacturing the self-drilling screw (10), including a head (20), a shaft (30) at least partially wearing a thread (35) and a drill point (40), from an austenitic 300 series steel base material with an uncoated surface hardness of 400-600 HV 0.3; and depositing a Zn—Ni coating with a Ni-content between 12-15% on a surface of the austenitic 300 series steel base material.

8. The method of claim 7, wherein the Zn—Ni-coating has a thickness between 5-30 µm.

9. The method of claim 7, wherein the Zn—Ni coating exhibits a Vickers hardness between 410-450 HV0.1.

10. The method of claim 7, wherein the manufacturing of the self-drilling screw (10) includes initially cold forming a blank of raw austenite 300 series steel to reduce a diameter thereof in a first operation and, in following operations cold forming the head, the drill point and the thread.

* * * * *